Figure 1:
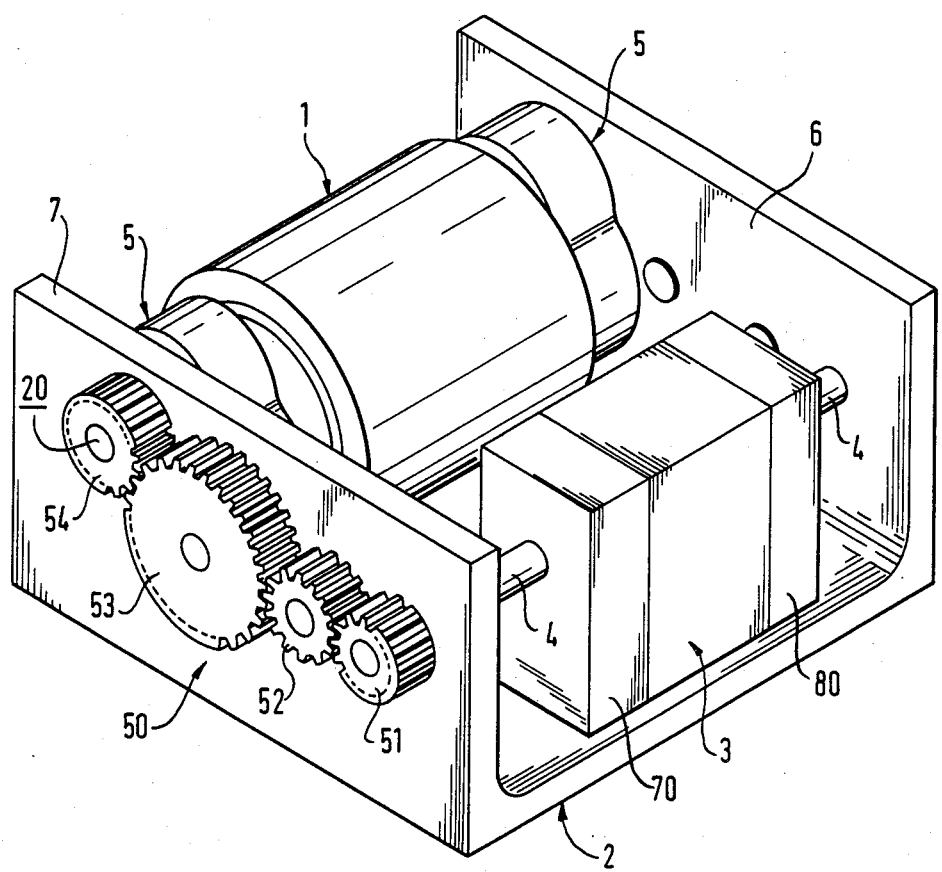

United States Patent [19]

Huber

[11] Patent Number: 4,697,694

[45] Date of Patent: Oct. 6, 1987

[54] ROLLER DRIVE UNIT

[75] Inventor: Thomas Huber, Iffeldorf, Fed. Rep. of Germany

[73] Assignee: Electro-Pneumatic-International GmbH, Hausham, Fed. Rep. of Germany

[21] Appl. No.: 717,273

[22] PCT Filed: Jul. 16, 1984

[86] PCT No.: PCT/DE84/00149

§ 371 Date: Mar. 20, 1985

§ 102(e) Date: Mar. 20, 1985

[87] PCT Pub. No.: WO85/00577

PCT Pub. Date: Feb. 14, 1985

[30] Foreign Application Priority Data

Jul. 21, 1983 [DE] Fed. Rep. of Germany ....... 3326355

[51] Int. Cl.[4] ............................................. B65G 13/02
[52] U.S. Cl. .................................................. 198/782
[58] Field of Search ............................. 198/782, 791; 193/35 SS; 244/137 R

[56] References Cited

U.S. PATENT DOCUMENTS 3,034,637  5/1962  Manna .
3,280,414  10/1966  Layne .
3,698,539  10/1972  Schwarzbeck .
3,737,022  6/1973  DeNeefe et al. ...................... 198/782

FOREIGN PATENT DOCUMENTS 906434  1/1954  Fed. Rep. of Germany .
1956946  11/1970  Fed. Rep. of Germany .
2414663  1/1979  France .

Primary Examiner—Robert J. Spar
Assistant Examiner—D. Glenn Dayoan
Attorney, Agent, or Firm—Sughrue, Mion, Zinn, Macpeak, and Seas

[57] ABSTRACT

The roller drive unit displays a drive roller (1), which is drivable by a motor (3) and rotatably borne in a guide equipment (5), by which it is pivotable with respect to a base (2) between a lower rest setting and an upper rest setting over a circularly arcuate movement path. A control equipment for the pivotation of the drive roller (1) is provided, which comprises a clutch device constructed for the transmission of a torque between a gear arrangement (50) driving the drive roller (1) and the guide equipment (5). The gear arrangement displays a first gear wheel which is driven by the motor and in opposite sense drives a second gear wheel mounted secure against rotation on the drive shaft of the drive roller (1). In order to attain a simplest possible build-up with small overall height, it is provided that the shaft (20) of the first gear wheel is rotatably borne fixedly located with respect to the base (2) and that the circularly arcuate movement path, constrained by the guide equipment (5), of the drive roller (1) is arranged concentrically with the rotational axis of the shaft (20) of the first gear wheel.

41 Claims, 23 Drawing Figures

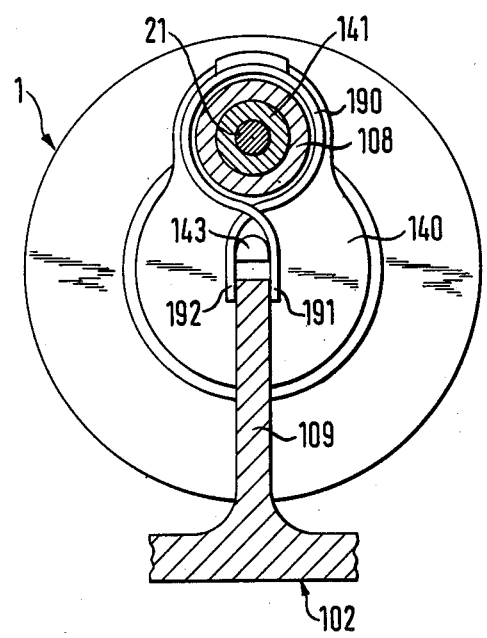

ROLLER DRIVE UNIT

The present invention relates to a roller drive unit, for the drive of articles movable on a conveyor track, with at least one drive roller which is rotationally drivable by a motor through at least one gear arrangement transmitting the driving torque, is rotatably borne by its drive shaft in a guide equipment, by means of which it is pivotable with respect to a base on a circularly arcuate movement path, and which is movable by means of a control equipment on the circularly arcuate movement path between a lower rest setting and an upper drive setting, in which it stands in engagement with the underside of the article to be driven, wherein the control equipment comprises a clutch device constructed for the transmission of a limited torque between the gear arrangement and the guide equipment and the limit value of the torque is greater than the driving torque required for the raising of the drive roller into the operative setting and wherein the gear arrangement comprises a first gear wheel which is driven by the motor and drives in opposite sense a second gear wheel mounted secure against rotation at the drive shaft of the drive roller.

Roller drive units of that kind are for example used for the drive of freight receptacles, such as freight containers or pallets, movable on roller conveyor tracks. A preferred field of application is freight loading systems in air freight traffic, in which the containers in the loading space of an aircraft are transported on roller or ball conveyor tracks to the provided anchoring places in the loading space.

A roller drive unit of that kind is described in U.S. Pat. No. 3,698,539 and in the DE-PS No. 1 956 946. This known unit displays a base frame to be fastened at the floor of the freight space and a bearing frame, which at one end is pivotably borne on the base frame and which carries a motor in the proximity of the pivot axis and, at a spacing from the pivot axis, a rotatable drive roller, however borne to be locally fixed with respect to the bearing frame, as well as a cam control arrangement, which is connected with the free end of the bearing frame and by means of which the bearing frame is pivotable with respect to the base frame out of the rest setting into the operative setting. The drive shaft of the motor is coupled through a gear train with the input of a planetary gear, the one output of which is coupled by way of a gear arrangement with the drive shaft of the drive roller, whilst the other output of the planetary gear drives the cam control unit.

In the rest state, the bearing frame rests on the base frame so that the drive roller stands lowered at a spacing from the bottom of a freight receptacle guided forward thereover on a roller conveyor track. In order to set the freight receptacle into motion on the roller track, the motor, which drives the input of the planetary gear, is first switched on. At this instant, the drive roller is retained against rotation with a predetermined braking torque by means of a slipping clutch so that the driving torque of the motor acts through the other output of the planetary gear onto the cam control unit which thereby by its cams, which bear against the base frame, pivots the bearing frame upwardly into the operative setting until the drive roller gets into engagement with the underside of the bottom of the freight receptacle. Because of the weight of the freight receptacle, the movement of the cam control unit is blocked thereby and the drive roller is pressed to an increasing degree against the receptacle bottom. Thereby, however also the planetary gear output, which drives the cam control unit, is blocked so that the planetary gear output, which drives the drive roller, exerts a torque to an ever greater degree on the drive roller until the limit value of the braking torque of the slipping clutch is overcome and the drive roller, pressed firmly against the receptacle bottom, starts to rotate so that this is moved forwad in a direction dependent on the rotational direction of the drive motor.

In this known roller drive unit, it is problematic in practice that the entire gear arrangement from the motor to drive roller on the one hand and to the cam control on the other hand is structured very expensively and displays many parts. Beyond this, a cam control is required so that the entire build-up contains a large number of mechanically moved parts. Thereby, not only high costs result during the manufacture, but also a high weight and a large type of construction most undesired in aircraft construction. In addition, the large number of relatively moved parts leads to undesired probability of wear and requires short maintenance invervals in order to assure the reliability demanded in aircraft construction.

The fact, too, that the planetary gear connecting the cam control unit, the drive roller and the motor gear one with the other displays a quite high internal friction, proves to be problematical in practice. Thereby, it is required to choose the magnitude of the maximum braking torque of the slipping clutch to be very high in order that the cam control unit first raises the bearing frame from the base frame and presses the roller against the receptacle bottom before the driving torque of the motor sets the drive roller into rotation. Due to this high braking torque of the slipping clutch, which is necessary for overcoming the internal bearing friction of the planetary gear and for overcoming the driving force needed by the cam control unit, a very high contact pressure force of the drive roller at the receptacle bottom results however already before the start of the rotation of the drive roller so that suddenly on the onset of the rotation of the drive roller very high tangential force peaks arise, which act as reaction force peaks on the floor structure of the aircraft freight space. This is extraordinarily undesirable in practice, since certain limit loadings of the floor structure may not be exceeded because of the lightweight mode of construction in aircraft construction and, in particular, shock loadings are extremely undesirable. Beyond this, a so-called fluid friction coupling is used according to the state of the art as slipping clutch, the operational behaviour of which is very dependent on temperature. In view of the high temperature differences arising in the operation of an aircraft, it is therefore required to choose the maximum torque of the slipping clutch to be so high that the desired medium value is not fallen below even in the case of the most unfavourable temperatures.

The task underlying the invention thus consists in creating a roller drive unit of the initially named species, which with simpler build-up displays a lower weight and a smaller overall size.

According to the invention, this problem is solved thereby, that the shaft of the first gear wheel is rotatably borne in fixed location relative to the base and that the circularly arcuate movement path, constrained by the guide equipment, of the drive roller is arranged concentrically with the rotational axis of the shaft of the first gear wheel.

In this structuring according to the invention, it thus provided that the drive roller is borne directly at a guide equipment which permits the drive roller to perform a pivotal movement along a circular arc which is arranged concentrically to the rotational axis of the shaft of the first gear wheel, wherein the shaft of the first gear wheel in its turn is borne locally fixed relative to the base, however rotatably. The clutch device, when the unit is driven through the motor, transmits a part of the driving torque between the gear arrangement and the guide equipment in such a manner that the drive roller is pivoted out of its lower rest setting along the circular arc upwardly into its operative setting until it abuts against the underside of the bottom of the freight receptacle disposed thereover. Since this torque is dimensioned merely in such a manner that the mass inertia moment of the drive roller and the guide equipment can be overcome, that the drive roller can thus pivot upwardly during the drive by the motor, the lifting force exerted at this instant on the floor of the freight receptacle lying thereover is very low, namely corresponding to the excess of the transmitted torque ove the mass inertia moment of the drive roller. Thus, at this instant, only a very small lifting force is exerted on the receptacle bottom. The roller, which at this instant on completion of the lifting movement is not yet turning, is now through the engagement with the receptacle bottom braked further against its provided rotational direction so that the torque acting on the guide equipment leads to an enhanced lifting. Thereby, the contact pressure force of the drive roller against the receptacle bottom is increased gradually and builds up up to a limit value which is dependent on the weight of the freight receptacle and the driving torque of the motor. At the same time, due to the now rotating drive roller, a tangential conveying force is exerted on the freight receptacle so that this in desired manner sets into movement on the roller track in the desired direction according to the rotational direction of the motor.

The onset of the driving force at the receptacle bottom on the switching-on of the roller drive unit thus takes place very softly and namely starting from a low value during the initial pressing of the roller against the receptacle bottom so that only very small reaction shock forces, which can readily be kept below the permissible value, arise on the anchoring structure of the roller drive unit, for example on the freight space floor of an aircraft.

This function according to the invention rests on the fact that, because of the particular construction of the guide equipment and of the control equipment provided with the clutch device, neither a special can control unit nor a planetary gear is required so that their friction forces or actuating forces disappear and the torque to be transmitted by the clutch device can thereby be kept small. A quite appreciable reduction in the constructional shape of the roller drive unit and its weight as well as a reduction in the number of the necessary moved parts results through the omission of the cam control equipment and of the planetary gear so that cost savings let themselves be attained in the manufacture and, due to the reduced wear of the few relatively moved parts, also in the maintenance. From the fact that the clutch device torque, which engages at the guide equipment, can be kept very small compared with the braking torque required in the state of the art, the advantage furthermore results that—in place of the slipping clutch, constructed for example as fluid friction coupling, usual according to the state of the art—mechanical or electro-magnetic clutch devices can be employed, the temperature dependence of which in practice is very small. Thereby, the predetermined torque of the clutch device can be set to the predetermined minimum value without the excess required because of the temperature influences in the state of the art.

It is to be emphasised as further advantage of the refinement according to the invention that the roller drive unit on the failure of one of its drive elements during the operation, for example of the motor, displays self-resetting properties, since the drive roller on the failure of the driving force automatically pivots away from the bottom of the freight receptacle downwardly into its rest setting so that no wear due to abrasion can arise between the receptacle and the drive roller in the case of a fault.

According to a possible refinement of the roller drive unit according to the invention, it is provided that a guide lever, the one end of which is pivotably borne concentrically with the rotational axis of the first gear wheel and in fixed location relative to the base and in the free end of which the drive shaft of the drive roller is rotatably borne, is provided as guide equipment at least at one axial side of the drive roller. When only one guide lever is arranged at one side, a particularly simple and light construction, producible with low overall size, results since the drive roller is in that case borne in free cantilever manner at the one guide lever.

Although it is possible to undertake the bearing of the guide lever and of the shaft carrying the first gear wheel separately at an axial spacing co-axially each with the other, it is however preferred that the first gear wheel is mounted secure against rotation on an intermediate shaft arranged parallelly to and at a spacing from the drive shaft of the drive roller and that the one end of the guide lever is borne to be pivotable about this intermediate shaft.

In case a high load capacity of the roller drive unit is required, one provides that a respective guide lever is provided at both axial sides of the drive roller. Due to the two-sided bearing of the drive roller, no bending moments are in that case exerted on the shaft of the drive roller.

It is particularly preferred that at least one of the guide levers is constructed as elongate hollow body, in which the first gear wheel and the second gear wheel mounted on the drive shaft are received each time. In this manner, both the gear wheels meshing each with the other are protected against pollution and at the same time housed in space-saving manner.

According to a preferred embodiment, it is provided that a clutch device, which transmits a torque between the gear arrangement and the guide equipment, is received in at least one of the guide levers. Hereby, the clutch device is protected against mechanical damage and pollution and a space-saving build-up results.

A mechanically simple structure with few movable parts distinguishes itself thereby, that a gear arrangement, which transmits the driving torque from the motor to the drive roller, is provided at only one axial side of the drive roller and that both guide levers are rigidly coupled by means of a connecting strap bridging over the drive roller.

In case, however, a high mechanical load capacity of the unit is demanded, one provides that a gear arrangement, which transmits the driving torque from the motor to the drive roller, is provided at both axial sides of the drive roller. In that case, both the guide levers are each constructed as a respective hollow body, in which the first and the second gear wheel and, in a given case, a clutch device are housed each time. In order that possible differences, caused by manufacturing tolerances, of both the gear arrangements can be equalised in an embodiment of that kind with two parallel gear arrangements, that both the gear levers thus move synchronously in operation, it is provided according to a preferred embodiment that the gear arrangement is driven at the one side by the motor through a differential gear, the input of which is coupled with the rotor of the motor and the first output of which is connected with the gear arrangement, whilst the second output of the differential gear is connected with a setting device for the equalisation of assymmetries of both the gear arrangements. This setting device can simply be constructed as manually settable screw spindle which acts on the second output in such a manner that assymmetries of the effective lengths of both the gear arrangements are compensated for.

It is preferred that the first and second gear wheel are spur wheels. In order that a rotation of the drive roller in opposite sense to the intermediate shaft is attained, one provides that the first gear wheel is coupled through n pairs of freewheel spur wheels with the second gear wheel, for which n=0, 1, 2 . . . applies. The freewheel spur wheels can be inserted between the first and second spur wheels in order to bridge over a greater intermediate space and to keep the required diameters of the individual gear wheels small in order that a small overall size lets itself be maintained.

In so far as the carrying structure does not permit a direct bearing and mounting of the parts of the roller drive unit, it is preferred that a frame with two bearing plates, which stand upright at a spacing each from the other, is provided as base and that an intermediate shaft, which is driven by the motor and carries the first gear wheel secure against rotation, is rotatably borne in at least one of these bearing plates.

For absorption of the reaction torque, it can be provided that the housing of the motor is fastened at the base to be secure against movement.

It is advantageous when the intermediate shaft is sub-divided into two intermediate shaft stubs each borne in the bearing plates and that at least one of these intermediate shaft stubs is driven by the motor. In this embodiment, a low overall size lets itself be attained, since the drive roller can in this case be arranged between the inner ends of the intermediate shaft stubs.

It is preferred that the clutch device is constructed for the transmission of a torque independent of the relative rotational speed of the coupled elements.

In certain cases of application, the clutch device can also be constructed as fluid friction clutch or as electromagnetic clutch.

Preferably, the clutch device is constructed as roller friction clutch; the basic build-up and manner of construction are known to the expert.

According to one embodiment of the invention, the clutch device is arranged for the transmission of the torque between the first gear wheel and the associated end of the guide lever. In certain applications, it can also be advantageous that the clutch device is arranged for the transmission of the torque between the second gear wheel and the associated end of the guide lever. In each case, the cluch device transmits a part of the driving torque delivered by the motor to the guide equipment in such a manner that the drive roller, on the switching-on of the motor, is raised out of the rest setting into the operative setting.

According to a special refinement, it is provided that two bearing discs, which are arranged to both sides of the first gear wheel connected with the shaft and surround the shaft of the first gear wheel, are provided as clutch device within the guide lever constructed as hollow body, that a plurality of brake rollers, which are distributed over the circumference and each arranged at an angle inclined to the radial direction, is arranged between each bearing disc and the respective opposite side face of the first gear wheel, that one of the bearing discs is supported at the inside wall of the guide lever and that the other bearing disc is pressed against the brake rollers by means of a spring equipment supported at the opposite inside wall. It is in that case preferred that both the bearing discs are held secure against rotation.

In an alternative embodiment, it is provided that two bearing discs, which are arranged to both sides of the second gear wheel connected with the drive shaft and surround the drive shaft of the drive roller, are provided as clutch device within the guide lever constructed as hollow body, that a plurality of brake rollers, which are distributed over the circumference and each arranged at an angle inclined to the radial direction, is arranged between each bearing disc and the respective opposite side face of the second gear wheel, that one of the bearing discs is supported at the inside wall of the guide lever and that the other bearing disc is pressed against the brake rollers by a spring equipment supported at the opposite inside wall. In this case, too, both the bearing discs are mounted secure against rotation and the spring equipment is preferably constructted as plate spring.

A preferred further embodiment of the roller drive unit according to the invention distinguishes itself thereby, that the guide lever or levers is or are constructed as two-armed levers which are each pivotably borne in about their centre concentrically with the rotational axis of the first gear wheel, that a respective drive roller is rotatably borne in each of both free ends of the two-armed levers, that a second gear wheel is mounted secure against rotation at the drive shaft of the drive rollers and that both the drive rollers are driven in opposite sense by the first gear wheel. In this embodiment, two drive rollers are thus provided, of which the one is pivoted in the one direction upwardly into its operative setting for the driving of the articles, whilst the other driving roller is provided for the driving of the articles in the opposite direction. Both the driving rollers thus drive the article each time in only one direction so that they are in operation not subjected to any alternating loading and the wear of the driving roller is therefore extraordinarily small. Thereby, it is possible, by comparison with an embodiment with only one drive roller operating in both directions, to provide both the drive rollers according to this embodiment with half the roller length so that an appreciable reduction in the overall size is made possible in axial direction of the drive rollers. Beyond that, it is in quite particularly advantageous manner avoided in this embodiment that the drive roller must for the reversal of the drive direction pivot downwardly on its circular movement path into the other operative setting as is required in the construction with a single drive roller. A quite particularly small overall height of the drive roller unit therefore lets itself be attained.

It is preferred that both the drive rollers are arranged parallelly at a spacing each from the other, while a respective two-armed lever is provided at both axial sides of both the drive rollers. In a particularly advantageous embodiment with few moved parts, it is provided that the first and second gear wheel are provided at the two-armed lever at only one axial side of both the drive rollers. In this case, it is expedient when both the two-armed levers are rigidly coupled through a connecting element. This connecting element can either be a connecting strap or, however in a special embodiment, the housing of the drive motor.

The clutch device, which is provided for bringing about the pivotal movement of the guide levers, is in that case arranged for the transmission of the torque between the first gear wheel or the intermediate shaft connected therewith and the neighbouring middle region of the two-armed lever. In this case, too, the two-armed lever can at least in part be constructed as hollow body, in which apart from the gear wheels also the clutch device is enclosed.

For limitation of the overall size, it is preferably provided that the motor is arranged between both the drive rollers and the two-armed levers and displays drive shafts which are coupled with its rotor shaft and project out at both its axial sides and on which the two-armed levers are pivotably borne as intermediate shafts and of which at least one carries a first gear wheel to be secure against rotation.

For relief of the intermediate shafts or the drive shafts of the motor, it can be provided that the intermediate shafts are rotatably supported in bearing plates of the base.

According to a particular embodiment, the housing of the motor is fixedly located at the base so that the reaction torque can be conducted away.

According to a further preferred embodiment, it is provided that the motor comprises a gear, which drives at least an intermediate shaft carrying the first gear wheel in opposite sense to the rotation of the rotor shaft of the motor, and that the housing of the motor is rotatable in at least a limited range of rotational angle with respect to the base, yet connected secure against rotation with the two-armed lever. In this embodiment, the first gear wheel is electromagnetically coupled—as clutch device for the transmission of the limited torque—through the associated intermediate shaft, the gear, the rotor and the housing, which is connected with the stator of the motor, with the two-armed lever.

In this refinement, on the switching-on of the motor, the rotor of the motor is initially braked through the mass inertia of the gear, the gear connection to the drive roller and of the drive roller itself as well as through the gear friction in such a manner that, instead of the rotor, the stator of the motor now starts to turn in opposite rotational direction. Since the stator and the housing of the motor are rigidly connected with the two-armed lever, the two-armed lever will pivot in the desired direction and bring the one drive roller into its operative setting. After the drive roller has abutted against the underside of the article to be moved, this pivotal movement is terminated and the rotor of the motor and the drive roller driven by it now start to turn. In this refinement, the transmission of the torque to the guide levers thus takes place through electromagnetic coupling between the rotor and the stator of the motor.

Additionally, it can still be provided in this embodiment that the intermediate shaft driven from the rotor shaft is coupled by way of a brake equipment with the guide lever so that a higher braking torque is opposed to the rotor on the switching-on of the motor and the pivotal movement of the guide lever is thereby securely assured.

In order to assure the lowering behaviour of the drive roller or rollers out of the operative setting into the rest setting in all circumstances on the switching-off of the motor, it can be provided in the case of all the previously described embodiments that the guide levers are biassed by means of a spring equipment into the rest setting of the drive roller.

Preferably, the spring equipment consists of a helical spring, which encloses the intermediate shaft carrying the first gear wheel and the free ends of which engage on the one hand at the bearing plate of the base and on the other hand at the associated guide lever.

In order to assure a reliable function, it is in that case provided that the torque exerted by the spring equipment is smaller than the torque transmitted by the clutch device, yet greater than the torque needed for the turning of the gear arrangement and the motor out of the operative setting back into the rest setting. On the switching-on of the motor, the clutch torque is therefore greater than the opposite torque exerted by the spring equipment so that the drive roller can move out of the rest setting into the operative setting. On the switching-off of the motor in the drive setting, the spring equipment can now indeed not overcome the clutch torque of the clutch device, however the spring equipment is sufficiently strong in order to turn the gear arrangement and the motor connected therewith back in opposite direction so that the guide lever together with the drive roller can lower out of the operative setting into the rest setting.

According to an alternative embodiment of the roller drive unit according to the invention, it is provided that the base displays two upright guide plates, which are held at a spacing and about parallelly each to the other and between which the drive roller is arranged obliquely, and that guide grooves, which are concentric with the intermediate shaft and circularly arcuate in correspondence with the path of movement of the drive roller and in which the ends of the drive shaft of the drive roller are freely displaceable, yet braked against rotation by the predetermined torque of the clutch device, are shaped as guide equipment at the mutually facing side faces of the bearing plates. This embodiment distinguishes itself by a quite particularly simple mode of construction with few moved parts so that a small overall size and high reliability also let themselves be attained. The guide levers provided in the remaining embodiments are in that case replaced by circularly arcuate guide grooves in the bearing plates. The manner of function is in that case the same as for the remaining embodiments.

A build-up, in which the clutch device is formed by the friction surfaces of the drive shaft of the drive roller, is particularly simple.

A higher reliability however lets itself be attained in this embodiment when the clutch device is for example constructed as roller friction clutch, is arranged between the second gear wheel mounted on the drive shaft of the drive roller and the bearing plate surfaces neighbouring the guide grooves and transmits the limited torque between these parts. In this case, a special clutch device is thus provided, which is independent of the actually undesired bearing friction of the shaft of the drive roller.

Since the drive roller is exposed in operation to a certain wear through the friction at the freight receptacle bottom, a refinement is preferred in practice, in which the drive roller comprises a cylindrical rigid body and a shell enveloping the circumferential surface and being of elastic, friction-causing material such as polyurethane or nitrile rubber. Through this refinement, the abrasion of the surface of the drive roller is reduced on the one hand and a good frictional contact with the receptacle bottom is also attained on the other hand.

Preferably, it is provided in all described embodiments of the roller drive unit according to the invention that the drive shaft of the drive roller is sub-divided into two separate shaft stubs which are borne secure against rotation, yet axially displaceable in a central passage bore of the drive roller, and the inner ends of which are arranged at a spacing each from the other and spring-biassed outwardly each against the other. The second gear wheels are in that case each time mounted secure against rotation, yet axially displaceable on the shaft stubs. Through this build-up, the drive roller lets itself be exchanged without disassembly of the roller drive unit in the case of wear or damage thereby, that both the shaft stubs are pressed together inwardly so far against the spring bias that they come out of their bearing places and the drive shaft can thereby be taken out of the roller drive unit.

Figure 2:
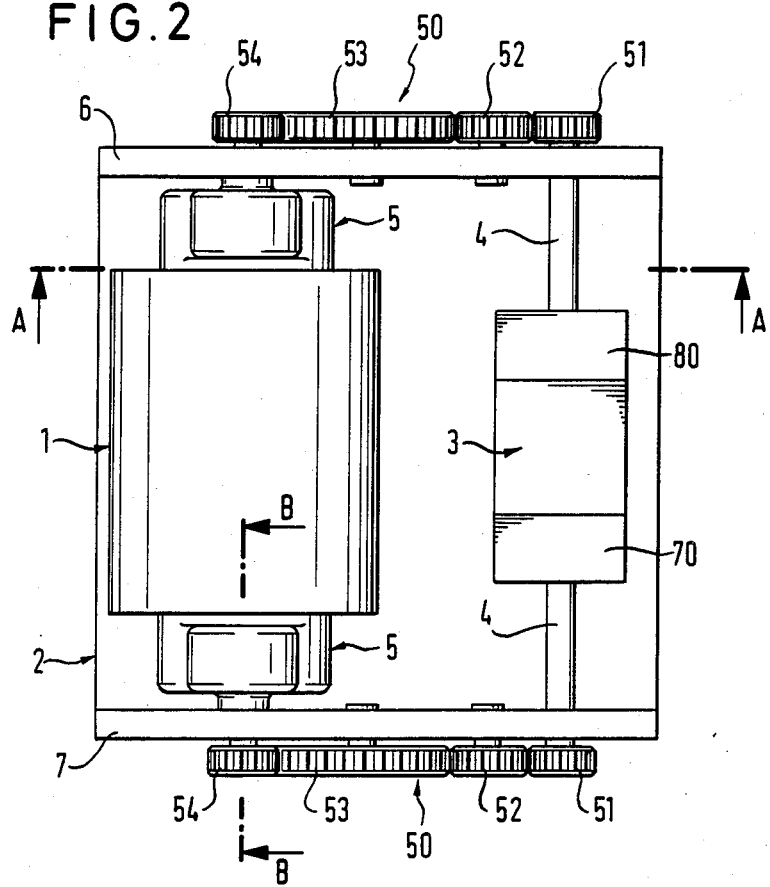
Figure 3:
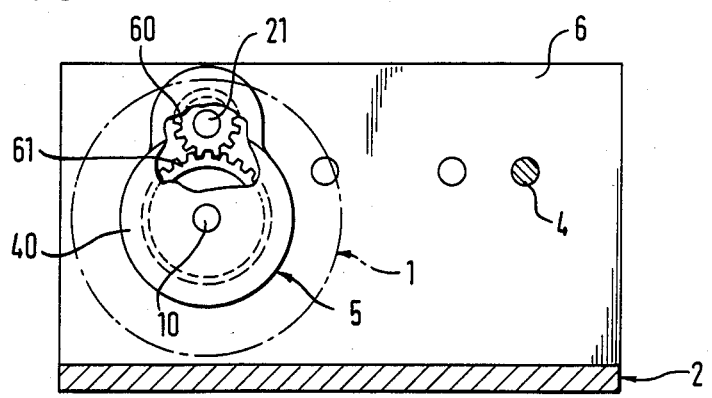
Figure 4:
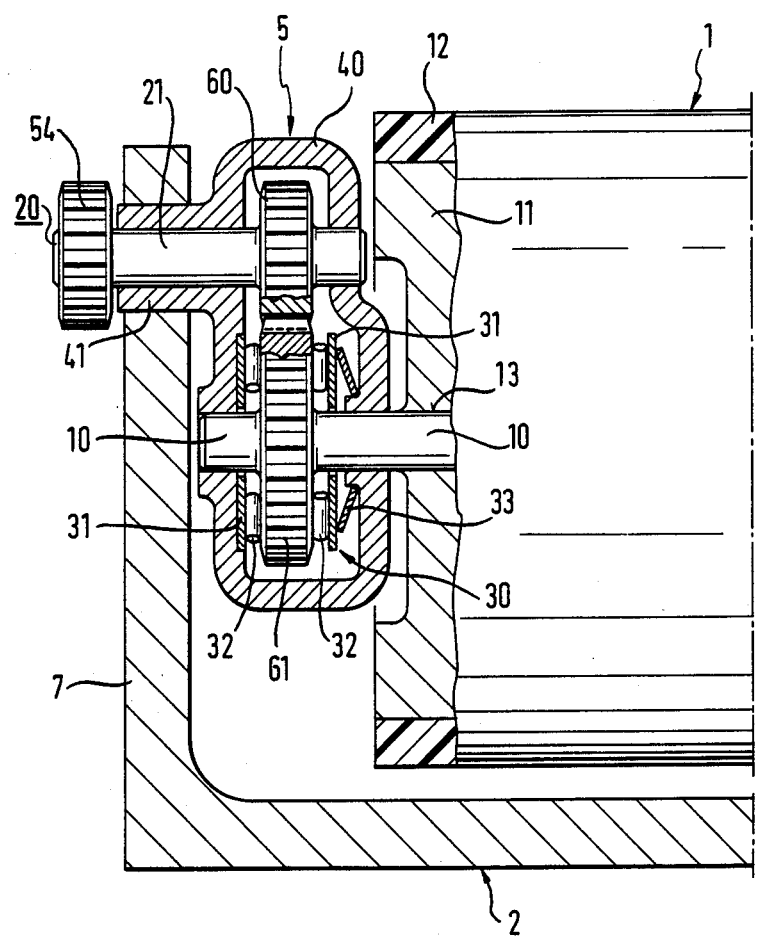
Figure 5:
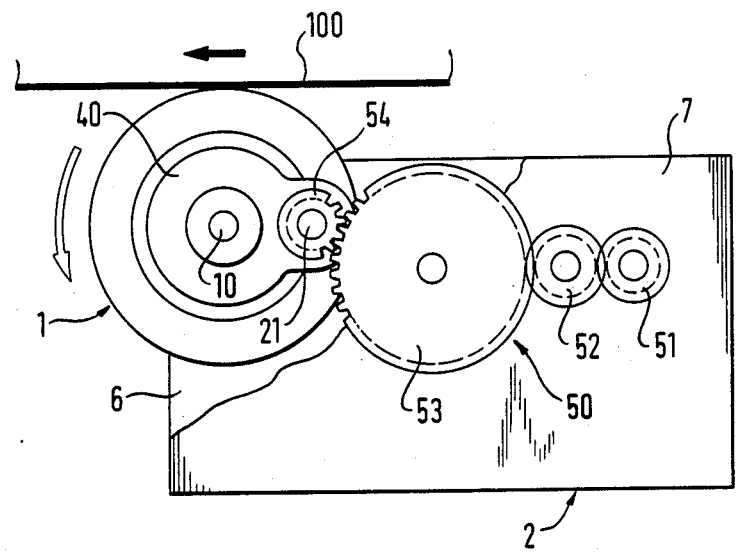
Figure 6:
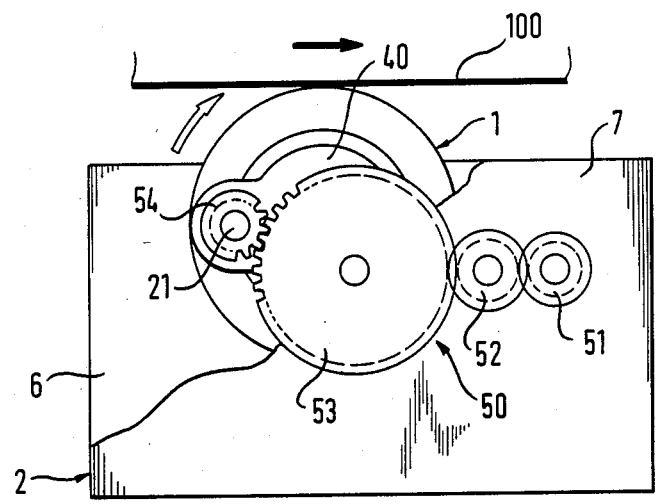
Figure 7:
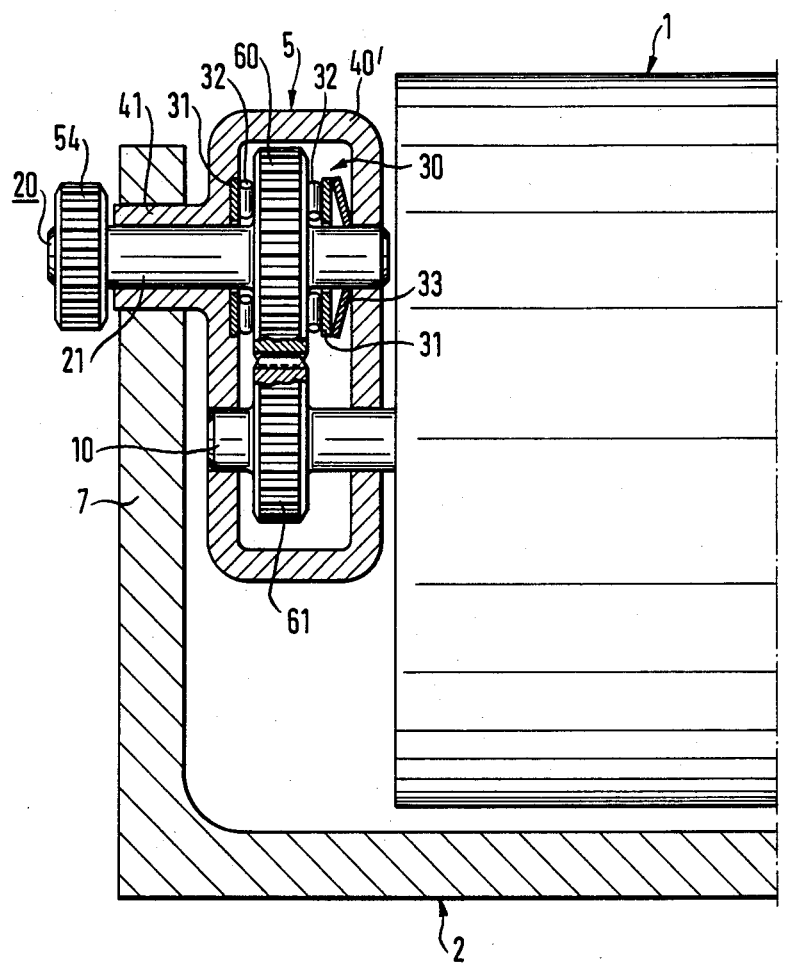
Figure 8:
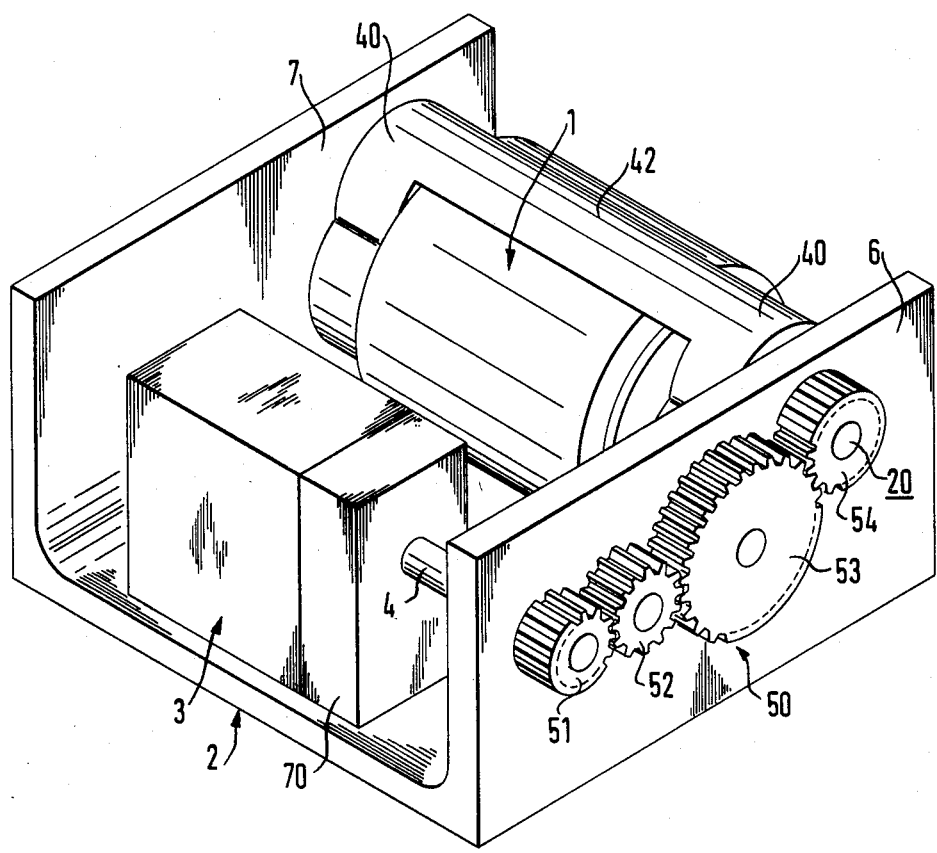
Figure 9:
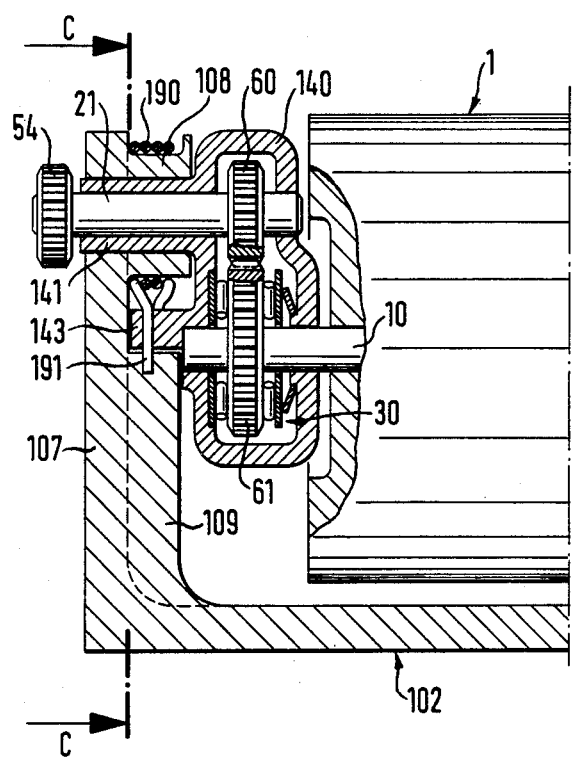
Figure 10B:
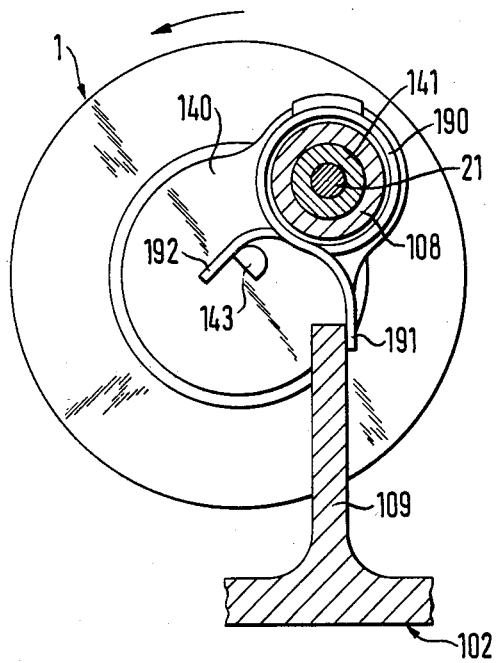
Figure 11:
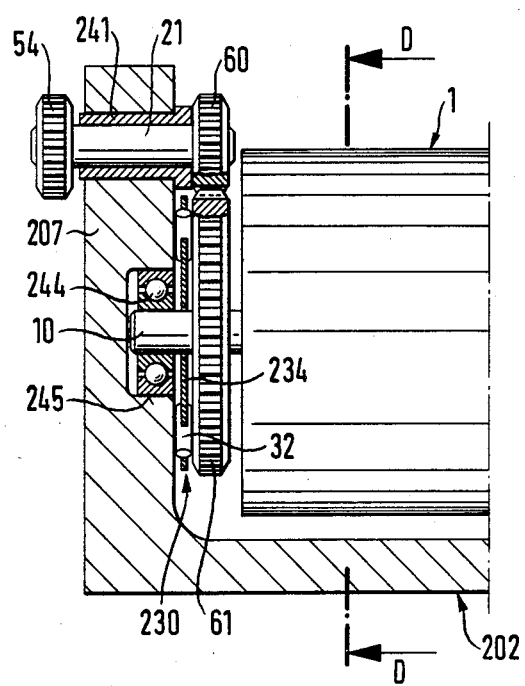
Figure 12A:
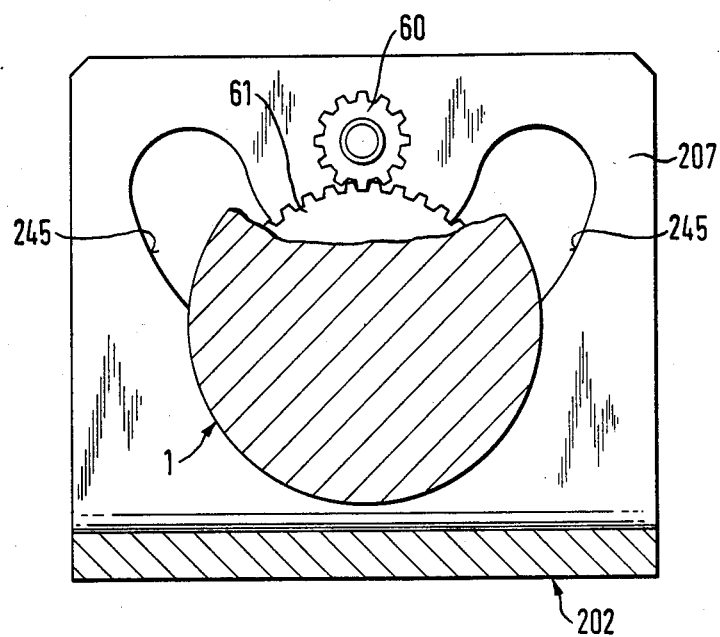
Figure 13:
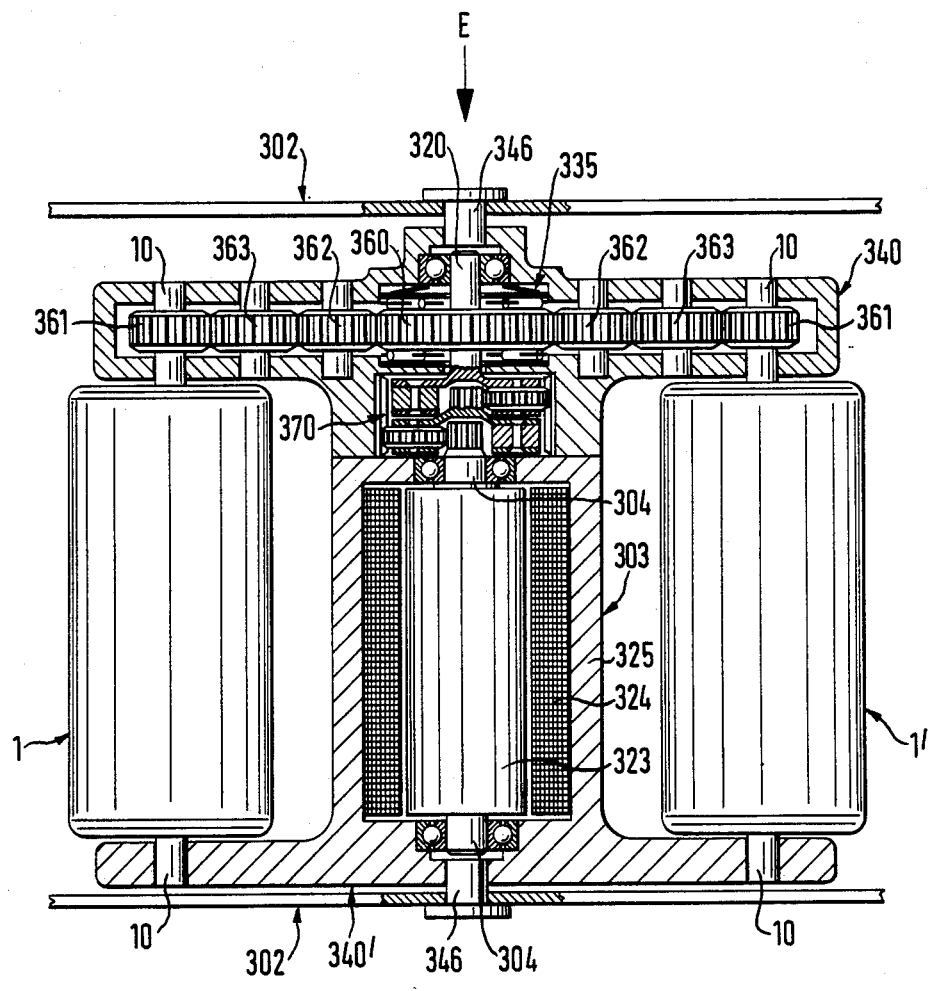
Figure 14A:
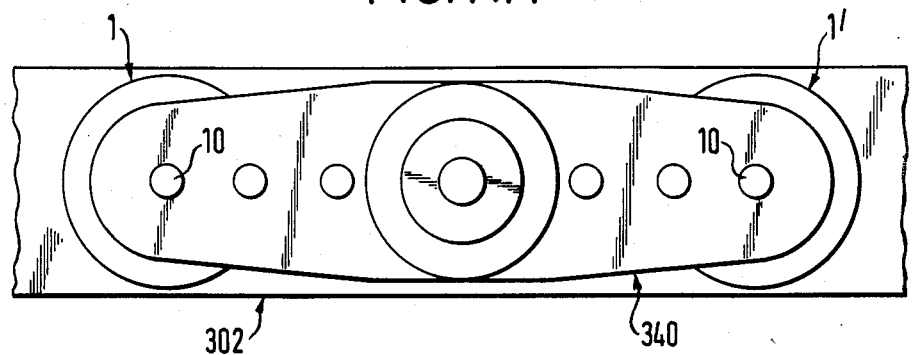
Figure 15:
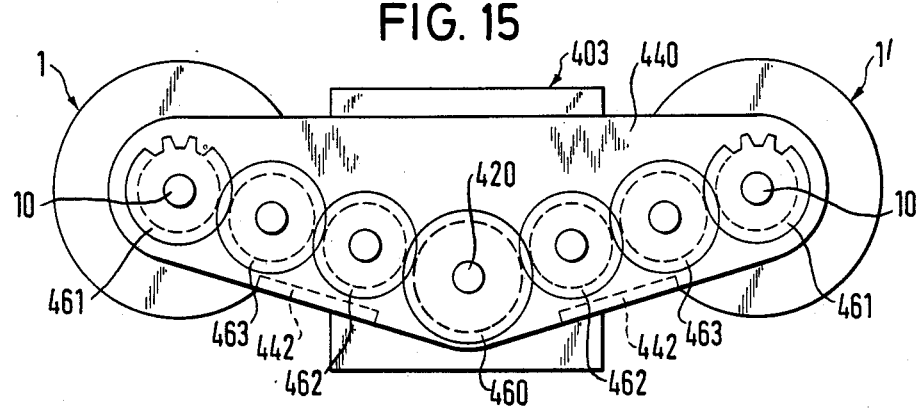
Figure 16:
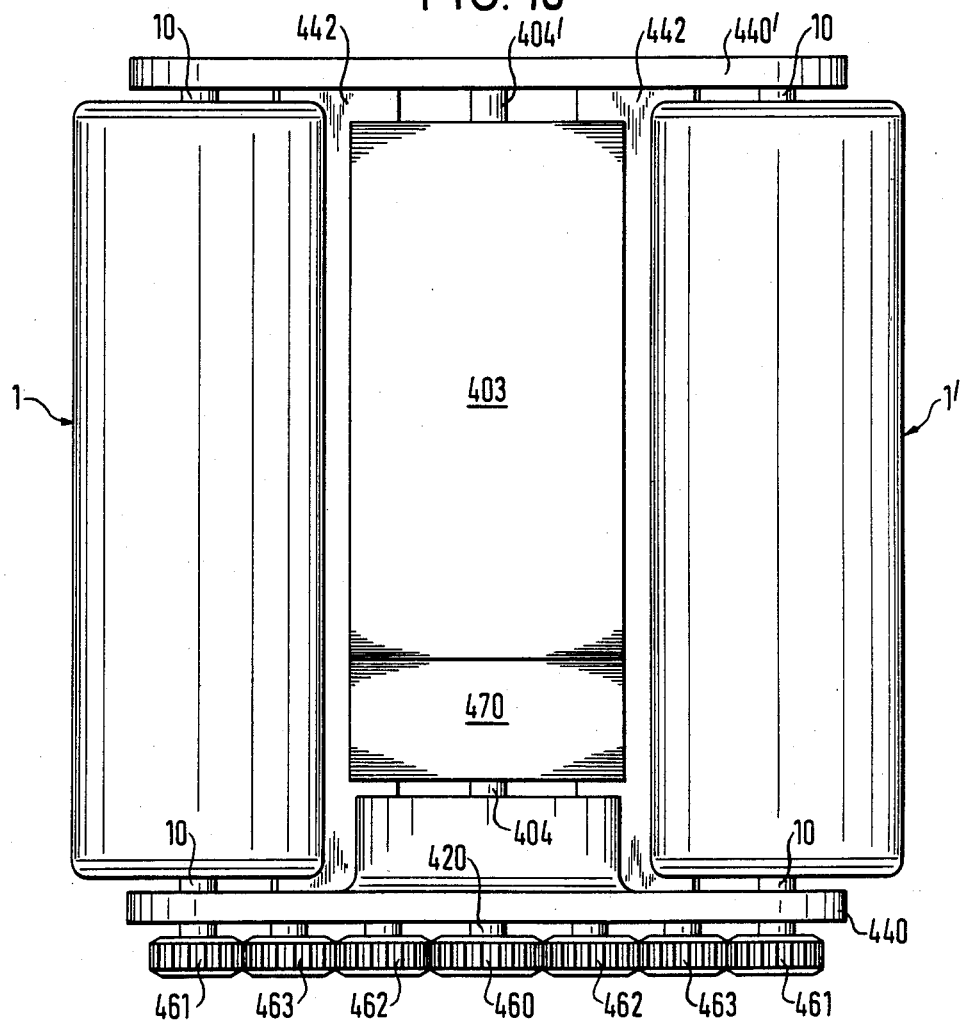
Figure 17:
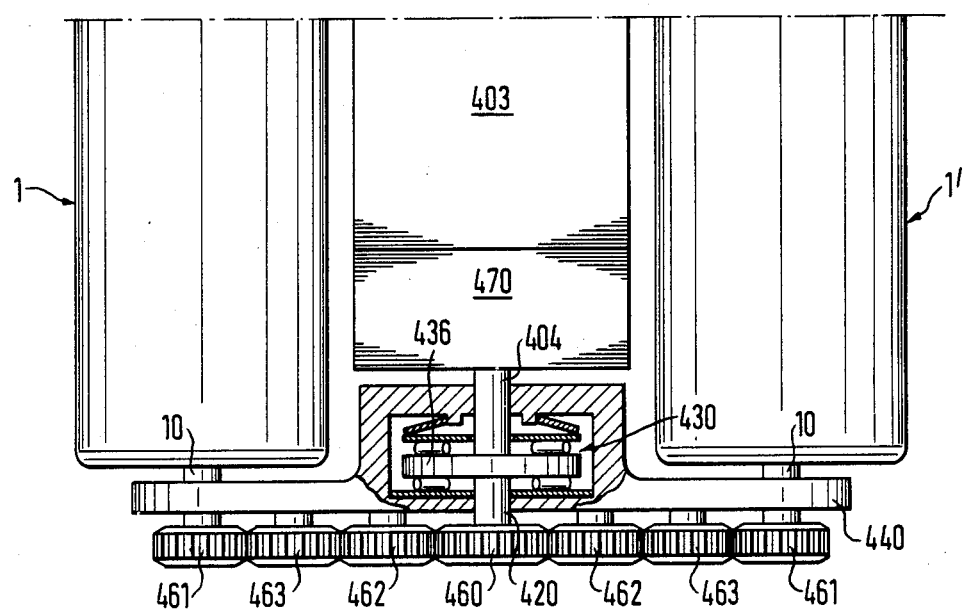

The invention is explained more closely in the following by way of example with reference to the drawing; there show:

FIG. 1 a perspective illustration of a schematic embodiment of a roller drive unit according to the invention, FIG. 2 a plan view onto the roller drive unit of the FIG. 1, FIG. 3 a vertical sectional view according to the section line A—A of the FIG. 2, wherein a part of the guide lever of the guide equipment is shown broken away and the drive roller is shown in its rest setting, FIG. 4 a vertical partial sectional view particularly of the guide equipment and the drive roller according to the section line B—B of the FIG. 2, FIG. 5 a partially broken away side view of the roller drive unit, wherein the drive roller is shown in the one raised drive setting, FIG. 6 a side view corresponding to the FIG. 5, wherein the drive roller is illustrated in its opposite drive setting, FIG. 7 a vertical partial section, substantially corresponding to that of the FIG. 4, of an embodiment, in which the clutch device is arranged between the first gear wheel and the guide lever, FIG. 8 a perspective illustration of an embodiment of the roller drive unit according to the invention, in which unit a gear connection from the motor to the drive roller is provided at only one side and both the guide levers are rigidly connected each with the other, FIG. 9 a vertical partial section, comparable with that of the FIG. 4, particularly of the guide equipment of a further embodiment, in which a spring equipment biassing the drive roller into the rest setting is provided, FIGS. 10A, B and C partial sectional views along the section line C—C of the FIG. 9, wherein the drive roller is respectively shown in its rest setting and in both its possible operative settings, FIG. 11 a vertical partial sectional view of the guide equipment of a further embodiment, in which the guide equipment is constructed as circularly arcuate guide groove in a bearing plate, FIGS. 12A, B and C each partial sectional views along the line D—D of the FIG. 11, in which the drive roller is respectively shown in its rest setting and both its drive settings, FIG. 13 an embodiment according to the invention with two-armed guide levers and two drive rollers in partially sectioned plan view, FIGS. 14A, B and C side elevations of the roller drive unit according to FIG. 13 in direction of the arrow E, in which the bearing plate lying at the front and the bearing spigot are omitted and the unit is shown in the rest setting and both the drive settings, FIG. 15 a side elevation of a further embodiment with double-armed guide levers and two drive rollers, FIG. 16 a plan view of the embodiment of the FIG. 15 and FIG. 17 a partial plan view according to the FIG. 16, wherein the guide lever is partially cut open for illustration of the coupling device.

In the embodiment of the roller drive unit shown in the FIGS. 1 and 2, the roller drive unit displays a base 2, which is provided with two bearing plates 6 and 7 standing upright parallelly each to the other at a spacing. Mounted between these bearing plates 6 and 7 at one end of the base 2 is a motor 3, which displays a drive shaft 4, which projects out to both sides, is borne in both the bearing plates 6 and 7 and which at its end projecting away outside the bearing plates 6 and 7 carries a respective toothed wheel 51 firmly connected with it. This drive shaft 4 is connected at each outer side of the bearing plates 6 and 7 through a gear connection 50 with an intermediate shaft 20 borne in the bearing plates 6 and 7 in the proximity of the other end of the base 2. Each of these gear connections consists of a toothed wheel 51 connected with the drive shaft 4 of the motor, both the freewheel toothed wheels 52 and 53 borne on bearing spigots at the bearing plate 6 and 7 and a toothed wheel 54 firmly connected with the intermediate shaft 20, wherein all these toothed wheels of each gear connection 50 stand meshingly in engagement one with the other. Through these gear connections 50, the spacing between the drive shaft 4 of the motor and the intermediate shaft 20 is bridged over and a desired transmission ratio is assured in a given case.

The intermediate shaft 20 is coupled at the inner side of both the bearing plates 6 and 7 through a respective control equipment 5 with the drive roller 1 extending transversely between both the bearing plates 6 and 7.

As is shown in the FIGS. 3 and 4, each control equipment 5 comprises as guide equipment a guide lever 40, a clutch device 30 and first and second gear wheels 60 and 61 constructed as spur wheels. As is illustrated in section in the FIG. 4, the intermediate shaft 20 is sub-divided and comprises two intermediate shaft stubs 21, each of which is arranged at one of the bearing plates 6 and 7. Each guide lever 40 is shaped as elongate hollow body and at one end displays an outwardly projecting bearing bush 41, which is rotatably borne in a bore of the associated bearing plate 6 and 7. Each intermediate shaft stub 21 is rotatably borne in the associated bearing bush 41 and in a bore of the oppositely disposed wall of the guide lever 40 constructed as hollow body and carries the first gear wheel 60 secure against rotation in the interior of the guide lever 40. The associated end of the drive shaft 10 of the drive roller 1 is borne in corresponding bearing bores at the other, free end of each guide lever 40. Mounted secure against rotation within the guide lever 40 at each of the ends of the drive shaft 10 is the respective second gear wheel 61, which meshes with the first gear wheel 60 of the intermediate shaft stub 21 and rolls along on this during a pivotal movement of the drive shaft 10. As schematically shown in the FIGS. 1 and 2, the motor 3 comprises two gear units 70 and 80, namely a step-down gear 70 arranged at one axial side of the motor 3 and a differential gear 80 provided at the other axial side. The input of this differential gear 80 is driven from the rotor of the motor 3, whilst its first output is directly coupled through the corresponding drive shaft 4 with the associated gear connection 50. The second output of the differential gear, which is for example constructed as planetary gear, is connected with a (not shown) setting device which, for example, consists of a manually settable screw spindle and makes it possible through appropriate setting to equalise mechanical differences between both the gear connections arranged at the respective bearing plates. Thereby, it is attained that both the guide levers 40 in operation always pivot synchronously each with the other out of the rest setting into the operative setting and conversely.

Furthermore, the clutch device 30, which generates a braking torque acting between the guide lever 40 and the drive shaft 10 of the drive roller 1 and against the rotational direction of the drive shaft 10, is arranged in the interior of each of the guide levers 40 constructed as hollow bodies, wherein this clutch device 30 is constructed as roller friction clutch. The build-up of a roller friction clutch of that kind is just as well known to the expert as its manner of function. In the case of the illustrated embodiment, the clutch device 30 comprises two, about annular bearing washers 31, which surround the drive shaft 10 at both sides of the second gear wheel 61 and of which the one is mounted secure against rotation at the inside wall of the guide lever 40 lying nearest the associated bearing plate 7 or 6, whilst the other bearing washer is supported at the opposite inside wall of the guide lever 40 by means of a spring equipment 33 constructed as plate spring. A plurality of circumferentially distributed brake rollers 32, arranged at an angle obliquely to the radial direction of the second gear wheel 61, is provided between each bearing washer 31 and the respective oppositely disposed side surface of the second gear wheel 61. These brake rollers can for example be held by a bearing cage (not illustrated in the drawing). Both the bearing washers with the brake rollers 32 are held by the spring equipment 33 constructed as plate spring under bias against the side surfaces of the second gear wheel 61. A braking torque, which acts against the respective rotational direction of the drive shaft 10 and is substantially independent of the rotational speed of the drive shaft, is exerted by the clutch device 30 on the second gear wheel 61 and thereby on the drive shaft 10 through this refinement.

As indicated in FIG. 4, the drive roller 1 comprises a rigid, about cylindrical body 11, which can be constructed as internally ribbed hollow body, for example of light metal. The external circumference of the body 11 is provided with a shell 12 of elastic, friction-causing and abrasion-resistant material such as nitrile rubber or polyurethane. The drive shaft 10 is received secure against rotation in a passage bore 13 of the body 11. This drive shaft 10 is sub-divided, according to an embodiment not illustrated in the drawing, into two separate shaft stubs which are each borne to be secure against rotation, yet axially displaceable at a respective end of the body 11. The inner ends of both the shaft stubs are arranged at a spacing each from the other and biassed one against the other outwardly by means of a spring equipment received in the passage bore 13 of the body 11. The respective second gear wheel 61 is mounted to be secure against rotation, yet axially displaceable on each of the free ends, each projecting in axial direction out of the body 11, of the shaft stubs of the drive shaft 11. This embodiment makes it possible to press both the shaft stubs by suitable tools completely into the interior of the body 11 against the spring bias so that the drive roller in the assembled state of the roller drive unit can be easily exchanged without previously having to take the entire arrangement apart.

The manner of operation of this embodiment of the roller drive unit is now explained in the following with reference to the FIGS. 3, 5 and 6. In the rest state, i.e. with the motor 3 switched off, the drive roller 1 is disposed in its lower rest position as indicated in FIG. 3. If the motor 3 is now switched on, the intermediate shaft 20 is now set into rotation through both the gear connections 50 so that a driving torque is transmitted by way of the first gear wheel 60 to the second gear wheel 61. Since however the second gear wheel 61 and the drive shaft 10, connected therewith, of the drive roller 1 is acted on by a predetermined braking torque through the clutch device 30, the second gear wheel 61 in place of a pure locally fixed rotational movement rolls along the first gear wheel 60 so that the drive roller 1 is pivoted upwardly along a circularly arcuate path into its operative setting against the bottom of a freight receptacle 100 resting on a roller conveyor track above the roller drive unit, as shown in the FIG. 5. The braking torque at the drive shaft 10 is in that case so dimensioned that, although the bearing friction and the friction of the gear wheels 60 and 61 as well as the mass inertia moments of the drive roller 1 and the guide lever 40 are overcome, that the drive roller 1 is thus pivoted upwardly, however no noteworthy contact pressure force is exerted against the underside of the bottom of the freight receptacle 100. Through the abutting of the drive roller 1 against the bottom of the freight receptacle 100, the upward movement along the circularly arcuate path is now blocked so that the rolling movement of the gear wheels 60 and 61 is stopped and the drive shaft 10 begins to rotate in direction of the arrow in the FIG. 5. Through this rotation, an additional braking torque arises through the engagement of the circumference of the drive roller 1 witth the underside of the freight receptacle 100 and has the effect that the drive roller 1 is pivoted further upwardly and thereby exerts a contact pressure force on the bottom of the freight receptacle 100 so that a conveying force builds up, which is directed tangentially to the drive roller 1 and sets the freight receptacle 100 into movement. The rise in this tangential conveying force as well as in the contact pressure at the bottom of the freight receptacle takes place very softly in this manner so that the freight receptacle 100 sets itself into motion almost judder-free on the roller conveyor track. In this manner, the shock loading forces, which are exerted as reaction forces by the roller drive unit on the carrying structure, are very small.

In the same manner as described above, the roller drive unit operates in the reverse conveying direction when the rotational sense of the motor 3 is chosen to be reversed starting from the switched-off state and the rest setting of the drive roller 1. In this case, the drive roller 1 pivots in opposite direction along the circularly arcuate path upwardly into its drive setting in reverse direction as illustrated in the FIG. 6.

When the motor 3 is switched off starting from the operative position of the drive roller, either according to FIG. 5 or to FIG. 6, thus during the conveying operation, the contact pressure force of the drive roller 1 against the receptacle bottom falls away so that the drive roller 1 due to its weight now again drops down into its rest position and the conveying operation is interrupted. This manner of function is assured also in the case of a failure of the motor or of another element of the drive arrangement so that merely the drive of the freight receptacle is interrupted in the case of a disturbance.

In the description of the now following further embodiments of the roller drive according to the invention, the same reference symbols are employed for the parts identical or acting identically with those of the preceding embodiment.

Shown in the FIG. 7 is a modified embodiment which differs from the embodiment described in the preceding merely in that the clutch device 30 within the guide lever 40' transmits the braking torque between the first gear wheel 60 and the associated end of the guide lever 40'. The clutch device 30 is accordingly arranged with its bearing discs 31, the brake rollers 32 and the spring equipment 33 around the intermediate shaft stub 1 to both sides of the first gear wheel 60. The manner of function of this embodiment corresponds completely to the function of the initially explained example of embodiment, since the braking torque of the clutch device 30 indeed acts through the meshing engagement of both the gear wheels 60 and 61 in like manner on the drive shaft 10 of the drive roller 1.

Shown in the FIG. 8 is a further alternative embodiment, which largely corresponds to both the examples of embodiment described in the preceding and in which however a gear connection 50 from the motor 3 to the intermediate shaft is provided only at one axial side of the drive roller at one of the bearing plates of the base. Beyond this, the first and the second gear wheel 60 and 61 and the clutch device 30 are provided in only one of both the guide levers 40, namely that which is arranged at the side of the gear connection 50. The guide lever 40 arranged on the other side of the drive roller 1 is borne merely by its bearing bush 41 in the associated bearing plate. Both the guide levers 40 are rigidly connected each with the other through a connecting strap 42 bridging over the drive roller 1. The connecting strap 42 is in the illustration shown in the FIG. 8 constructed integrally with both the guide levers 40, could however also be constructed as separate part and be connected by suitable fastening means with both the guide levers 40. Since a gear connection 50 is provided at only one side, the motor 3 can be constructed without the differential gear 80.

Figure 10C:
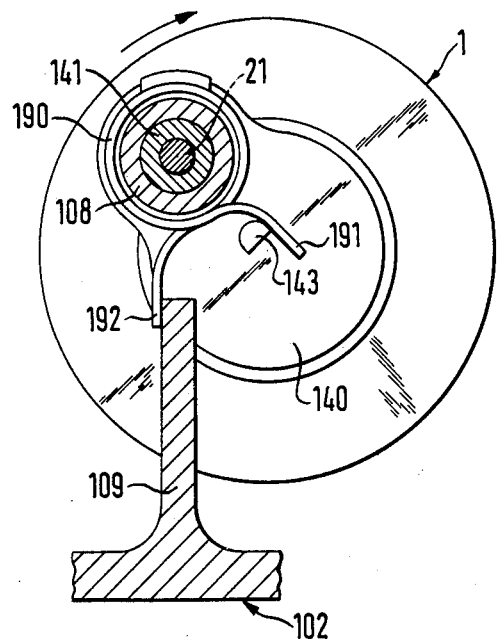

The FIGS. 9 and 10A, B and C show a further embodiment of the roller drive unit according to the invention, which embodiment is similar to the embodiment of the FIGS. 1 to 6, in which however the guide levers 140 are biassed by means of a spring equipment 190 into the rest setting of the drive roller 1. The base 102 carries an upright bearing plate 107, which is provided at its inside with an about vertical rib 109 and above the rib 109 with an annular projection 108, the bore of which is penetrated by the bearing bush 141 of the guide lever 140. The guide lever 140 carries a projecting spigot 143 at the side of the bearing bush 141, thus at the side facing the bearing plate 107, which spigot projects into the intermediate space between the rib 109 and the annular projection 108. Arranged as spring equipment 190 around the annular projection 108 is a helical spring, the free ends of which lie as abutment limbs 191 and 192 against the side surfaces of the rib 109. The spigot 143 of the guide lever 140 is in the rest setting of the drive roller according to FIG. 10A arranged between both the abutment limbs 191 and 192 somewhat above the upper end of the rib 109. When the drive roller is pivoted out of its rest setting of the FIG. 10A into one of its drive settings shown in the FIGS. 10B and 10C, the one abutment limb of the spring equipment 190 each time bears against the rib 109, whilst the other abutment limb of the spring equipment 190 is drawn along by the spigot 143 of the guide lever 140 so that the spring equipment 190 is stressed and thereby endeavours to press the drive roller back into its rest setting. In this manner, it is assured that the drive roller is guided back into its rest setting on the switching-off of the motor even when, for example due to wear phenomena, an increased bearing friction occurs, which would counteract the return into the rest setting. The dimensioning of the spring force of the spring equipment 190 is designed in such a manner that the torque exerted by the spring equipment on the guide lever 140 is smaller than the braking torque transmitted by the clutch device 30, however greater than the torque needed for the turning of the gear arrangement 50, 60 and 61 and of the motor out of the operative setting back into the rest setting. Through this dimensioning of the spring equipment, it is assured that the bias exerted by the spring can be overcome by the torque transmitted by the clutch device on the switching-on of the motor 3 so that the drive roller 1 can move out of its rest setting into the operative setting. Although the spring equipment 190 can thereby not overcome the torque of the clutch device on the pivoting of the roller out of the operative setting back into the rest setting, the spring equipment is however strong enough in order to turn the entire gear arrangement 50, 60 and 61 and the motor 3 back against the original direction of rotation so far that the drive roller 1 is returned into its rest setting.

Described now with reference to the FIGS. 11 and 12A, B and C is a further modified embodiment which is similar to the preceding embodiments, however displays the differences explained in the following.

Figure 12B:
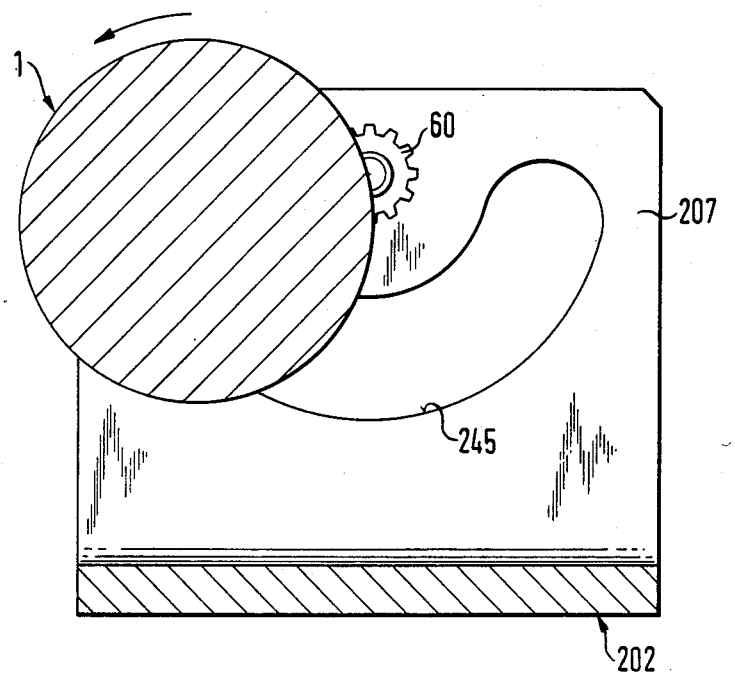
Figure 12C:
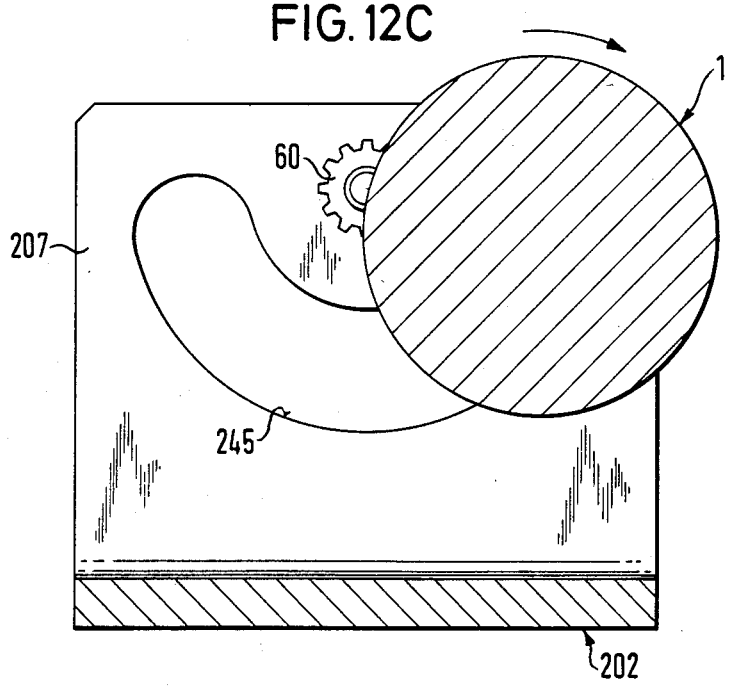

As the FIG. 1 shows, the base 202 displays an upright bearing plate 207, in the upper part of which the intermediate shaft stub 21 is rotatably borne in a bearing bush 241. The intermediate shaft stub 21, as in the embodiments explained in the preceding, carries the spur wheel 54, which belongs to the gear connection 50, at the outside of the bearing plate 207 and the first gear wheel 60 at the inside of the bearing plate. As is to be seen in the FIG. 11 in conjunction with the FIG. 12, a circularly arcuate guide groove 245, within which a bearing 244 constructed as rolling bearing is freely displaceable, is shaped at the inside of the bearing plate 207. The drive shaft of the drive roller 1 is rotatably borne in the bearing 244. The opositely disposed bearing plate of the base 202 is formed in corresponding manner.

A clutch device 230, which generates a braking torque between the second gear wheel 61 and the wall regions neighbouring the guide groove, is arranged between the second gear wheel 61 mounted secure against rotation on the drive shaft 10 of the drive roller 1 and that inside wall of the bearing plate 207, which lies adjacent to the guide groove 245. The clutch device 230 is constructed as roller friction clutch. In the embodiment shown in the FIG. 11, the clutch device 230 in simplified structure consists merely of a plurality of brake rollers 32, which are arranged between the side surface of the second gear wheel 61 and the oppositely disposed wall of the bearing plate 207 and are held by a cage 234. The manner of function of this embodiment corresponds to that of the embodiment of the FIGS. 1 to 6 so that a further explanation is dispensable for the expert. As is shown in the FIGS. 12A, 12B and 12C, the drive roller 1 can starting from its rest setting according to FIG. 12A on the switching-on of the motor be pivoted along the guide groove 245 into one of the operative settings illustrated in the FIGS. 12B and 12C.

In a not shown modification of the embodiment of the FIG. 11, the clutch device, which is arranged as roller friction clutch between the second gear wheel 61 and the inside wall of the bearing plate 207, can be omitted. In this case, the drive shaft 10 of the drive roller 1 is borne rotatably and displaceably in the guide groove without special bearing 244 so that the friction surfaces of the drive shaft 10 take care of the required braking torque at the walls of the guide groove.

A further modified embodiment of the roller drive unit according to the invention is now described with reference to the FIGS. 13 and 14A, B and C. As shown in plan view in partially sectioned illustration in the FIG. 13, this embodiment displays two guide levers 340 and 340', which are arranged parallelly at a spacing each from the other and of which each is constructed as two-armed lever pivotably borne in its middle. A respective drive roller 1 and 1' is rotatably borne at each of the free ends of both the guide levers 340 and 340'. A motor 303, the housing 325 of which is rigidly connected with both the two-armed guide levers 340 and 340', is arranged in the middle between both the drive rollers 1 and 1' arranged parallelly at a spacing each from the other. Each of both the guide levers 340 and 340' is borne to be pivotable with respect to the base 302 by means of a respective bearing spigot 346 pivotably at a bearing plate, arranged about perpendicularly to the plane of the drawing, of the base 302. The base is in this embodiment preferably formed directly by the longitudinally extending side walls of a profile rail of the roller conveyor track provided for the transport of the articles 100. This has the advantage that the space requirement needed for the installation of the roller drive unit is kept to the minimum given by the clear width of the profile rail of the roller conveyor track.

Both the drive rollers 1 and 1' are built up in the same manner as explained in detail in the preceding with reference to the remaining embodiments of the roller drive unit according to the invention.

The two-armed guide lever 340, disposed below in the FIG. 13, comprises a plate, which is arranged perpendicularly to the longitudinal axes of both the drive rollers 1 and 1', borne as two-armed lever on the bearing spigot 346 and which at its one side surface and centrally with respect to the bearing spigot 346 carries a hollow body which is constructed as housing 325 of the motor 303 and rigidly connected with the other guide lever 340. The stator 324 and the rotor 323 of the motor are received in this housing 325 of the motor, as is illustrated in the drawing, wherein the stator 324 of the motor is rigidly connected with the housing 325. The drive shafts 304 of the motor are rotatably borne in the housing 325. The second guide lever 340 is constructed as two-armed lever in the structure of an elongate hollow body which is borne in about its centre on the bearing spigot 346 to be pivotable with respect to the base 302. An about annular, hollow projection, which by its free end is rigidly connected with the housing 325 of the motor, is shaped on in the middle of that side surface of the guide lever 340, which faces the motor. Arranged in the interior of this annular projection is a gear 370, which is constructed as planetary gear and the input of which is coupled with the associated drive shaft of the motor 304, whilst the output is coupled with the intermediate shaft 320 rotatably borne centrally in the guide lever 340. This gear is constructed in such a manner that the intermediate shaft 320 rotates in opposite sense to the drive shaft 304 of the motor 303. Mounted secure against rotation on the intermediate shaft in the interior space of the guide lever 340 is a first gear wheel 360, which by way of freewheel gear wheels 362 and 363, which are rotatably borne in each of both the arms of the guide lever, drives a respective second gear wheel 361 in opposite sense. Both the second gear wheels 361 are respectively connected secure against rotation with the drive shafts 10 iof both the drive rollers 1 and 1'. A brake 335 is arranged centrally with respect to the intermediate shaft 320 between the inside walls of the hollow guide lever 340 and the side surfaces of the first gear wheel 360. This brake transmits a predetermined braking torque between the intermediate shaft 320 or the first gear wheel 360 and the guide lever 340. The brake 335 is constructed as roller friction brake, the build-up of which corresponds to the clutch device 30 of the FIG. 4. The relevant part of the description is referred to for explanation.

Figure 14B:
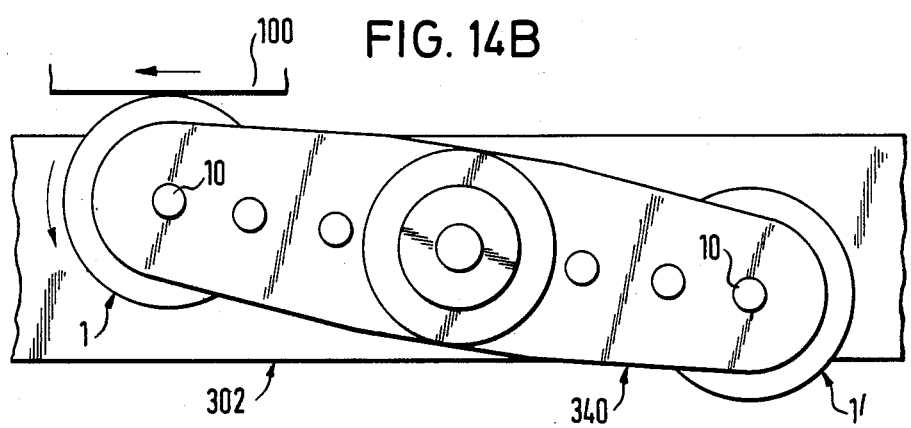

In the following, the manner of function of the embodiment described in the preceding is now explained. In the rest state, i.e. with the motor 303 switched off, the roller drive unit is disposed in equilibrium state in the setting of the FIG. 14A. In this setting, the longitudinal direction of the guide levers lies about parallelly to the plane of the roller conveyor track so that none of the drive rollers 1 and 1' stands in engagement with the bottom of an article 100 to be conveyed. When the motor 303 is now switched on, the drive shaft 304 of the motor initially tends to set into corresponding rotation. Since this rotation of the drive shaft 304 of the motor is however opposed by an appreciable resistance through the gear 370, the friction of the gear wheels 360, 362, 363 and 361 and furthermore through the brake 335 and finally through the mass inertia moment of both the drive rollers 1 and 1', the drive shaft of the motor 304 initially does not rotate with respect to the base, but instead thereof, the stator 324 of the motor turns in opposite direction. Since the stator 324 is rigidly connected by way of the housing 325 with both the guide levers 340 and 340', both the guide levers are through this rotation pivoted with respect to the base 302 around the bearing spigots 346 in such a manner that the roller drive unit is pivoted out of the rest setting into one of its operative settings, as shown in the FIGS. 14B or 14C.

In these operative settings, one of the drive rollers 1 or 1' is pressed each time against the underside of the article 100 resting on the conveyor track so that the pivotal movement is stopped. This means that such a high resistance against rotation is now opposing the stator of the motor that it can not turn further so that, instead of the stator 324, the rotor 323 and thereby the drive shaft 304 of the motor now start to turn and the drive roller 1 is set into rotation by way of the corresponding gear connection and in its turn, in engagement with the bottom of the receptacle, drives this.

Figure 14C:
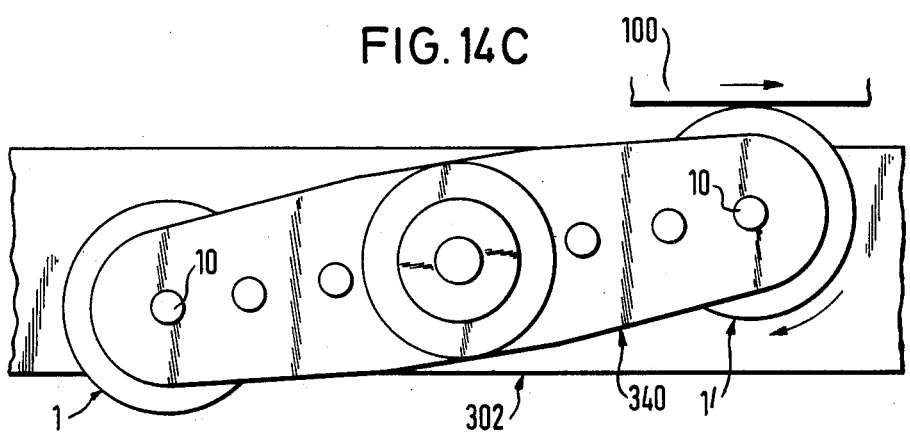

The respective operative setting of the roller drive unit in forward direction according to FIG. 13B or in reverse direction according to FIG. 14C is selected through appropriate control of the drive direction of the motor.

On the switching-off of the motor, the roller drive unit, starting out of one of both the operative settings, tilts back into its rest setting of the FIG. 14A. This pivoting-back can basically be effected thereby, that on switching-off, the rotor of the motor due to its mass inertia still rotates a little further so that the gear connection to the drive roller is placed under pressure stress. Through this pressure stress, the gear deforms slightly due to its elasticity and a certain mass of work energy is stored in this deformation of the gear. When the rotor of the motor now comes to rest, this stored elastic energy of the gear connection discharges itself thereby, that the stator 324 of the motor, which is after all rigidly connected with both the guide levers, pivots somewhat against the original rotational direction of the rotor so that the drive roller 1 or 1' previously disposed in the operative setting pivots downwardly into its rest setting.

In case the action of the effect described in the preceding should not suffice in the individual case, the lowering of the drive rollers out of the operative setting into the rest setting can also be effected thereby, that one lets the motor after the standstill turn briefly in opposite direction.

Alternatively hereto, a spring equipment corresponding to the embodiment described in the preceding with reference to the FIG. 9, can also be provided, which biasses the roller drive unit into its rest setting according to FIG. 14A.

In the afore-described embodiment of the FIG. 13, a brake 335 is arranged, as explained, between the first gear wheel 360 and the associated region of the guide lever 340 and opposes the initial rotation of the intermediate shaft 320 by a sufficiently large braking torque in order to promote the pivotation of the guide levers out of the rest setting into the operative setting, as described. This brake 335 can according to a modified embodiment also be omitted without substitute in case it proves in the individual case that the resistance, counteracting the intermediate shaft 320, of the gear wheels and of the mass inertia of the drive rollers suffices for the pivotation of the guide levers out of the rest setting into the operative setting. The clutch device, which is required for the transmission of the necessary torque to the guide levers, is in an embodiment of that kind formed without the brake 335 exclusively by the electromagnetic coupling between the rotor and the stator of the motor 303.

A further embodiment of the roller drive unit according to the invention is now described with reference to the FIGS. 15 to 17. This roller drive unit just as the preceding embodiment displays two guide levers 440 and 440', which are arranged parallelly at a spacing each from the other. Two drive rollers 1 and 1', which are rotatably borne in the free ends of both the guide levers 440 and 440', are provided at a spacing parallelly each to the other and transversely to these guide levers 440 and 440'. Both the guide levers 440 and 440' are rigidly connected each with the other through two transversely extending connecting straps 442, see FIGS. 15 and 16. A motor 403, the drive shaft 404 of which is firmly coupled with an intermediate shaft 420 at the side facing the guide lever 440, is provided between both the drive rollers 1 and 1'. At the side facing the other guide lever 440', the drive shaft of the motor 404' is borne to be freely rotatable in a bore of the guide lever 440'. The motor 403 comprises a step-down gear 407, which connects the rotor shaft of the motor (not shown) with the drive shaft 404. The guide lever 440' is borne in about its middle to be pivotable with respect to the base (not illustrated) on the drive shaft 404' of the motor 403. The guide lever 440 is likewise borne in its middle to be pivotable with respect to the base on the intermediate shaft 420. The motor itself is firmly connected with the base.

As is to be seen in FIG. 16, the guide lever 440 is constructed as elongate plate which is provided with bores for the bearing of the drive shafts of the drive rollers 1 and 1' and the drive shaft 404' of the motor. The structure of this guide lever 440' corresponds to the outline structure of the guide lever 440 shown in the FIG. 15.

The guide lever 440 likewise displays an elongate plate shaped similarly to the guide lever 440' and is beyond that provided in its middle region with a hollow projection, as is to be seen particularly in the FIG. 17. Received in the hollow space of this projection is a clutch device 430, which transmits a torque between the intermediate shaft 420 and the guide lever 440. The build-up of this clutch device corresponds substantially to the build-up of the clutch device 30 described with reference to the FIG. 4, however with the difference that the first gear wheel in the present embodiment is replaced by a clutch disc 436, which is connected secure against rotation with the intermediate shaft 420.

At that outer side of the guide lever 440, which is remote from the drive rollers 1 and 1' and the motor 403, a first gear wheel 460 is mounted secure against rotation on the end of the intermediate shaft 420 projecting through outwardly through the guide lever 440, which gear wheel is coupled through two freewheel gear wheels 462 and 463 borne on spigots at the associated lever arm of the guide lever 440 with a second gear wheel 461, which is mounted secure against rotation on the drive shaft 10, projecting through the free end of the guide lever 440, of the respective drive roller 1 and 1'. In this manner, both the drive rollers 1 and 1' are each driven in opposite sense to the rotation of the first gear wheel 460.

On the switching-on of the motor 403, the intermediate shaft 420 coupled with the drive shaft 404 of the motor starts to turn and transmits a torque by way of the clutch device 430 to the guide lever 440 and the guide lever 440' rigidly connected therewith so that the guide levers are pivoted with respect to the base and one of both the drive rollers 1 and 1' is raised out of the rest setting into the operative setting in engagement with the bottom of the receptacle disposed thereover. Thereby, the pivotal movement of the guide levers 440 and 440' is stopped. Since however the intermediate shaft 420 continues to rotate due to the drive of the motor, the driving torque of the motor is now transmitted by way of the gear connection 460, 462, 463 and 461 to the drive shaft 10 of the drive rollers so that these are set into rotation and the drive roller 1 or 1' raised into the operative setting drives the article disposed on the conveyor track. The manner of function thus corresponds substantially to the mode of operation of the afore-described embodiment, which is referred to for the remainder.

In deviation from the illustrated embodiment of the FIGS. 15 to 17, it can additionally still be provided that the intermediate shaft 420 or the drive shaft 404 of the motor as well as the drive shaft 404' of the motor are rotatably supported in (not illustrated) bearing plates of the base so that, not as for the illustrated embodiment, the motor 403 alone must transmit all forces to the base. In this manner, in particular, an overload of the rotor shaft of the motor and its bearings in the motor housing can be avoided.

I claim:

1. A roller drive unit for the drive of articles (100) movable on a conveyor track and comprising:
   at least one drive roller (1; 1, 1') carried by a drive shaft (10);
   a motor (3; 403);
   at least one gear arrangement (50, 60, 61; 460 to 463);
   guide equipment (40; 440, 440');
   and control equipment;
   said drive roller (1; 1, 1') being rotationally drivable by said motor (3; 403) through said gear arrangement (50, 60, 61; 460 to 463) which transmits driving torque from said motor to said drive roller;
   said drive shaft (10) being rotationally mounted in said guide equipment (40; 440, 440') such that said drive roller (1; 1, 1') is pivotable with respect to a base on a circularly arcuate movement path;
   said drive roller (1; 1, 1') being movable by means of said control equipment (40; 440, 440') along said circularly arcuate movement path between a lower rest position and an upper drive position in which latter position said drive roller (1; 1, 1') stands in engagement with the underside of said article (100) to be driven;
   wherein said control equipment comprises a clutch device (30; 430) designed for the transmission of a torque between said gear arrangement (50, 60, 61; 460 to 463) in such a manner that the value of said transmitted torque can be greater than the driving torque required for the raising of the drive roller (1; 1, 1') into said upper drive position;
   wherein said gear arrangement (50, 60, 61, 460 to 463) includes a first gear wheel (60; 460), which is borne on a shaft (20; 420) and is driven by the motor (3; 403), and a second gear wheel (61; 461) which is driven in the opposite sense by said first gear wheel and is mounted secure against rotation to said drive shaft (10) of said drive roller (1; 1, 1'); characterized in that
   said shaft (20; 420) of said first gear wheel (60; 460) is rotatably borne in fixed location relative to said base; and on that
   said circularly arcuate movement path of said drive roller (1; 1, 1'), which path is defined by said guide equipment (40; 440, 440'), is defined to be arranged concentrically with the rotational axis of said shaft (20; 420) of said first gear wheel.

2. A roller drive unit according to claim 1, characterized in that
   said guide equipment (40; 440, 440') comprises at least one guide lever (40; 440, 440') disposed at an axial side of said drive roller (1; 1, 1');
   said guide lever has at least one lever arm having two ends;
   one end of said lever arm is pivotably borne concentrically with said rotational axis of said first gear wheel (60; 460) and in fixed location relative to said base; and in that
   in the other (free) end of said lever arm is rotatably borne said drive shaft (10) of said drive roller (1; 1, 1').

3. Roller drive unit according to claim 2, characterised thereby, that the first gear wheel (60) is mounted secure against rotation on an intermediate shaft (20) arranged parallelly to and at a spacing from the drive shaft (10) of the drive roller (1) and that the one end of the lever arm is pivotably borne on the intermediate shaft (20).

4. Roller drive unit according to claim 3, characterised thereby, that a respective lever arm is provided at both axial sides of the drive roller (1).

5. Roller drive unit according to claim 4, characterised thereby, that at least one of the respective lever arms is constructed as an elongate hollow body, in which the first gear wheel (60) and the second gear wheel (61), mounted at the drive shaft (10), are received each time.

6. Roller drive unit according to claim 5, characterised thereby, that a clutch device (30), which transmits a torque between the gear arrangement (50, 60, 61) and the guide equipment, is received in at least one of the lever arms.

7. Roller drive unit according to claim 4, characterised thereby, that a gear arrangement (50, 60, 61), which transmits the driving torque from the motor (3) to the drive roller (1), is provided at only one axial side of the drive roller (1) and that both the lever arms are rigidly coupled by means of a connecting strap (42) bridging over the drive roller (1).

8. Roller drive unit according to claim 4, characterised thereby, that a gear arrangement (50, 60, 61), which transmits the driving torque from the motor (3) to the drive roller (1), is provided at both axial sides of the drive roller (1).

9. Roller drive unit according to claim 8, characterised thereby, that the gear arrangement (50, 60, 61) is driven at one side by the motor (3) through a differential gear (80), an input of which is coupled with the rotor of the motor (3), a first output of which is coupled with the gear arrangement (50, 60, 61) and a second output of which is connected with a setting device for the equalisation of assymmetries of both the gear arrangements.

10. Roller drive unit according to claim 1, characterised thereby, that the first and the second gear wheels (60, 61) are spur wheels.

11. Roller drive unit according to claim 10, characterised thereby, that the first gear wheel (60) is coupled through a pair of freewheel spur wheels (362, 363) with the second gear wheel (61).

12. Roller drive unit according to claim 1, characterised thereby, that a frame with two bearing plates (6, 7), which stand upright at a spacing each from the other, is provided as the base (2) and that an intermediate shaft (20), which is driven by the motor (3) and carries the first gear wheel (60) secure against rotation, is rotatably borne in at least one of these bearing plates (6, 7).

13. Roller drive unit according to claim 1, characterised thereby, that a housing of the motor (3) is fastened at the base (2) to be secure against movement.

14. Roller drive unit according to claim 12, characterised thereby, that the intermediate shaft (20) is subdivided into two separate intermediate shaft stubs (21) each borne in the bearing plates (6, 7) and that at least one of these intermediate shaft stubs (21) is driven by the motor (3).

15. Roller drive unit according to claim 1, characterised thereby, that the clutch device (30) is constructed for the transmission of a torque which is independent of the relative rotational speed of the gear arrangement and guide equipment.

16. Roller drive unit according to claim 1, characterised thereby, that the clutch device is constructed as a fluid friction clutch.

17. Roller drive unit according to claim 1, characterised thereby, that the clutch device is constructed as an electromagnetic clutch.

18. Roller drive unit according to claim 1, characterised thereby, that the clutch device (30) is constructed as a roller friction clutch.

19. Roller drive unit according to claim 2, characterised thereby, that the clutch device (30) is arranged for the transmission of the torque between the first gear wheel (60) and the guide lever (40').

20. Roller drive unit according to claim 2, characterised thereby, that the clutch device (30) is arranged for the transmission of the torque between the second gear wheel (61) and the associated end of the guide lever (40).

21. Roller drive unit according to claim 6, characterized thereby, that two bearing discs, which are arranged to both sides of a clutch disc (436) connected with the shaft (420, 404) and surround the shaft (420, 404) of the first gear wheel (460), are provided as the clutch device (430) within the guide lever (440) constructed as a hollow body, that a plurality of brake rollers, which are distributed over the circumference and each arranged at an angle inclined to the radial direction, is arranged between each bearing disc and the respective opposite side face of the clutch disc (436), that one of the bearing discs is supported at an inside wall of the guide lever (440) and that the other bearing disc is pressed against the brake rollers by means of a spring equipment supported at an opposite inside wall.

22. Roller drive unit according to claim 6, characterised thereby, that two bearing discs (31), which are arranged to both sides of the second gear wheel (61) connected with the drive shaft (10) and surround the drive shaft (10) of the drive roller (1), are provided as the clutch device (30) within the guide lever (40) constructed as hollow body, that a plurality of brake rollers (32), which are distributed over the circumference and each arranged at an angle inclined to the radial direction, is arranged between each bearing disc (31) and the respective opposite side face of the second gear wheel (61), that one of the bearing discs (31) is supported at an inside wall of the guide lever (40) and that the other bearing disc (31) is pressed against the brake rollers (32) by means of a spring equipment (33) supported at an opposite inside wall.

23. Roller drive unit according to claim 4, and further characterized thereby, that the guide levers are constructed as two-armed levers (340), which are each pivotably borne in about their centre concentrically with the rotational axis of the first gear wheel (360), that a respective drive roller (1, 1') is rotatably borne in each of both free ends of the two-armed levers (340), that a second gear wheel (361) is mounted secure against rotation at the drive shaft (10) of the drive rollers (1, 1') and that both the drive rollers (1, 1') are driven in opposite sense by the first gear wheel (360).

24. Roller drive unit according to claim 23, characterised thereby, that both the drive rollers (1, 1') are arranged parallelly at a spacing each from the other.

25. Roller drive unit according to claim 24, characterised thereby, that a respective two-armed lever (340, 340') is provided at each of both axial sides of both the drive rollers (1, 1').

26. Roller drive unit according to claim 25, characterised thereby, that the first and the second gear wheel (360, 361) are provided at the two-armed lever (340) at only one axial side of both the drive rollers (1, 1').

27. Roller drive unit according to claim 25, characterised thereby, that both the two-armed levers (340, 340') are rigidly coupled through a connecting element (325; 442).

28. Roller drive unit according to claim 23, characterised thereby, that the clutch device, (430, 436, 420) is arranged for the transmission of the torque between the first gear wheel or the intermediate shaft (420) connected therewith and the neighbouring central region of the two-armed lever (440).

29. Roller drive unit according to claim 25, characterised thereby, that the motor (403) is arranged between both the drive rollers (1, 1') and the two-armed levers (340, 340') and has drive shafts (404, 404'), which are coupled with its rotor shaft and project out at both its axial sides and on which the two-armed levers (340, 340') are pivotably borne as intermediate shafts and of which at least one carries a first gear wheel (460) to be secure against rotation.

30. Roller drive unit according to claim 29, characterised thereby, that the intermediate shafts (420; 320) are rotatably supported in bearing plates of the base.

31. Roller drive unit according to claim 29, characterised thereby, that the housing of the motor (403) is fixedly located at the base.

32. Roller drive unit according to claim 30, characterised thereby, that the motor (303) comprises a gear (370), which drives at least an intermediate shaft (320) carrying the first gear wheel (360) in an opposite sense to the rotation of the rotor shaft (304) of the motor, and that the housing (325) of the motor (303) is rotatable at least in a limited range of rotational angle with respect to the base (302), yet connected secure against rotation with the two-armed lever (340; 340').

33. Roller drive unit according to claim 32, characterised thereby, that the first gear wheel (360) is electromagnetically coupled—as a clutch device for the transmission of the limited torque—through the associated intermediate shaft (320), the gear (370), the rotor (323) and the housing (325), which is connected with a stator (324) of the motor (303), with the two-armed lever (340; 340').

34. Roller drive unit according to claim 23, characterised thereby, that the guide levers (140) are biassed by means of a spring means (190) into the rest position of the drive roller (1).

35. Roller drive unit according to claim 34, characterised thereby, that the spring equipment (190) comprises a helical spring (190), which surrounds the intermediate shaft (21) carrying the first gear wheel (60) and the free ends (190, 192) of which engage on the one hand at the bearing plate (107) of the base (102) or on the other hand at the associated guide lever (140).

36. Roller drive unit according to claim 34, characterised thereby, that the torque exerted by the spring equipment (190) is smaller than the torque transmitted by the clutch device (30), yet greater than the torque needed for the turning of the gear arrangement (50, 60, 61) and the motor (3) out of the operative setting back into the rest position.

37. Roller drive unit according to claim 1 characterised thereby, that the base (202) displays two upright guide plates (207), which are held at a spacing and about parallelly each to the other and between which the drive roller (1) is arranged obliquely, that the first gear wheel (60) is mounted secure against rotation on an intermediate shaft (20) arranged parallelly to, and at a spacing from, the drive shaft (10) of the drive roller (1), and that guide grooves (245), which are concentric with the intermediate shaft (21) and circularly arcuate in correspondence with the path of movement of the drive roller (1) and in which the ends of the drive shaft (10) of the drive roller (1) are freely displaceable, yet braked against rotation by the predetermined torque of the clutch device (230), are shaped as guide equipment at the mutually facing side faces of the bearing plates (207).

38. Roller drive unit according to claim 37, characterised thereby, that the clutch device is formed by the friction surfaces of the drive shaft of the drive roller (1).

39. Roller drive unit according to claim 37, characterised thereby, that the clutch device (30) is arranged between the second gear wheel (61) mounted on the drive shaft (10) of the drive roller (1) and those surfaces of the bearing plate (207), which are adjacent to the guide grooves (245), and transmits the limited torque between these parts.

40. Roller drive unit according to claim 1, characterised thereby, that the drive roller (10) comprises a cylindrical rigid body (11) and a shell (12) enveloping the circumferential surface and being of elastic, friction-causing material such as polyurethane or nitrile rubber.

41. Roller drive unit according to claim 40, characterised thereby, that the drive shaft (10) of the drive roller (1) is subdivided into two separate shaft stubs, which are borne secure against rotation, yet axially displaceable in a central passage bore (13) of the drive roller (1) and the inner ends of which are arranged at a spacing each from the other and spring-biassed outwardly each against the other.

* * * * *